March 28, 1939. M. A. THORNE 2,152,506
STEERING LINKAGE
Filed May 10, 1937

Inventor
Maurice A. Thorne
By Blackmore, Spencer & Flint
Attorneys

Patented Mar. 28, 1939

2,152,506

UNITED STATES PATENT OFFICE 2,152,506

STEERING LINKAGE

Maurice A. Thorne, Lansing, Mich., assignor to General Motors Corporation, Detroit, Mich., a corporation of Delaware Application May 10, 1937, Serial No. 141,614

3 Claims. (Cl. 280—95)

This invention relates to vehicle steering mechanism and more particularly to an improved system of motion transmitting linkage.

An object of the invention is to provide linkage which is especially adapted for use with independently sprung steerable wheels of the type wherein each wheel spindle is carried on the end of a pivoted suspension arm, the axis of which is diagonally related to the longitudinal center line of the vehicle, with a load carrying coil spring between the arm and chassis frame and which linkage is so related to the axis of the suspension arm as to minimize disturbance of steering geometry.

A further object of the invention is to provide steering linkage which provides ample clearance for the frame mounted engine and other units of the vehicle.

Figure 1:
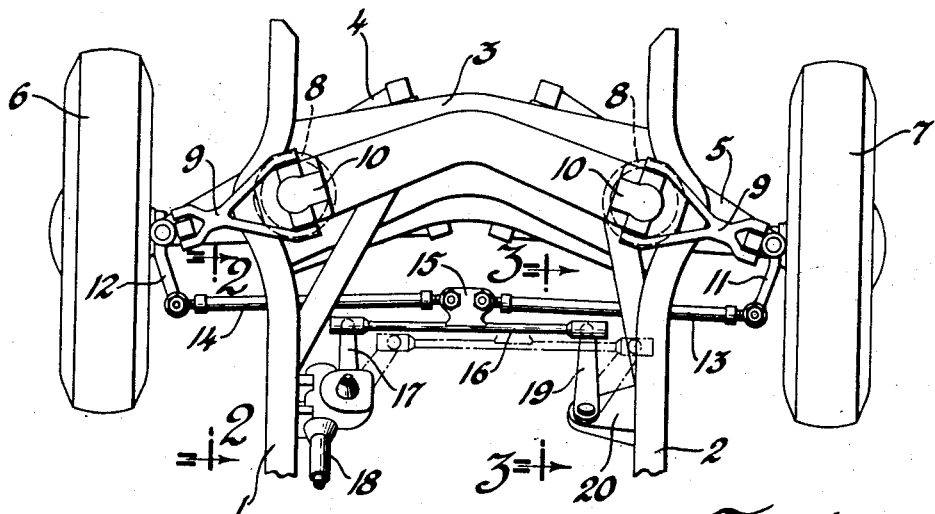
Figure 2:
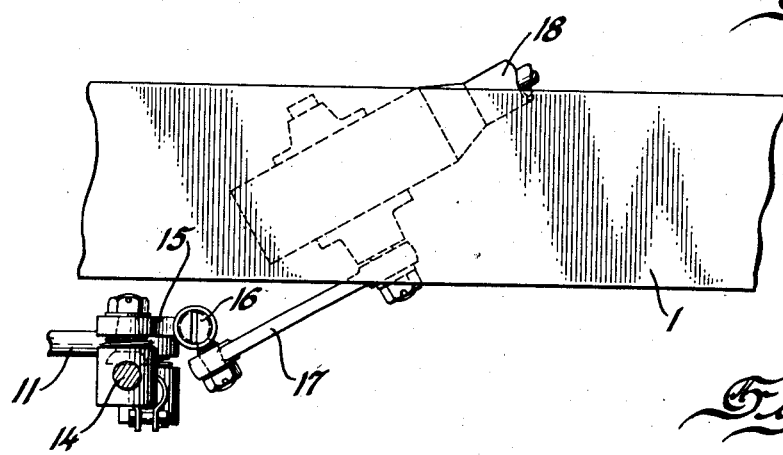
Figure 3:
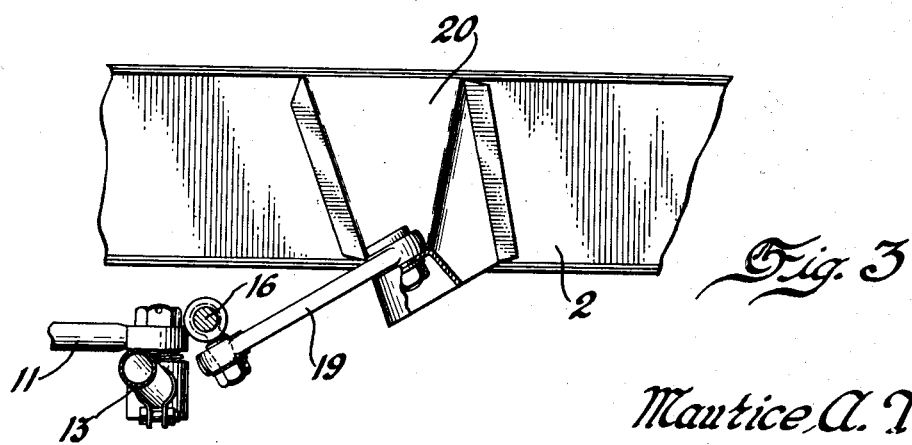

Other objects and advantages of the invention will become apparent during the course of the following specification having reference to the accompanying drawing wherein Figure 1 is a top plan view of a front portion of a vehicle chassis and running gear embodying the invention; and Figures 2 and 3 are enlarged views taken substantially on lines 2—2 and 3—3, respectively, of Figure 1.

The chassis of the vehicle comprises the side frame members 1 and 2 together with a front cross member 3. Pivoted in suitable brackets near the center of the front member 3 and on divergently related axes are a pair of outwardly extending suspension arms 4 and 5 in the ends of which are mounted steering knuckles for the road wheels 6 and 7, respectively. At an intermediate point each lever provides a seat for one end of a coil spring, shown by dotted lines at 8—8, the other end of which is seated on the chassis frame and through which the load is transferred. At its upper end each wheel knuckle is connected to an arm 9 which constitutes the operating lever for a shock absorber 10, one for each independently sprung wheel.

The wheel suspension referred to is substantially that being used on Oldsmobile automobiles and the steering linkage ordinarily used with this suspension involves a pair of tie rods joined at their outer ends to the wheels and at their inner ends to a bell crank lever pivotally mounted on the frame cross member 3 and adapted for connection with the usual steering column assembly. The conventional linkage has been found to interfere with the free relative disposition of the parts especially the wheel suspension system and the engine which drives the vehicle. In other words, if these parts are brought close together there is insufficient clearance between the engine oil pan and the swinging lever and with this in mind it is proposed here to eliminate the bell crank and its mounting on the frame and in lieu thereof to join the adjacent ends of the tie rods to a transverse link which can be supported and guided in the path below the oil pan limits.

Accordingly the drawing shows the spaced wheel steering arms 11 and 12 pivotally connected by suitable ball joints with the remote ends of the tie rods 13 and 14 arranged end to end and joined by ball and socket connections at their adjacent ends to a forwardly extending plate or ear 15 welded or otherwise secured to a transverse link 16. One end of the link 16 is pivotally connected to the swinging pitman arm 17 forming a part of the steering assembly column 18 which is offset to one side of the longitudinal center line and is secured to the frame member 1. The other end of the link 16 is pivoted to an idler lever 19 mounted on a frame bracket 20 carried by the side member 2 of the chassis frame. Thus the transverse link 16 is supported and guided for movement with the pitman arm 17 and in turn supports the adjacent ends of the tie rods 13 and 14 and through this linkage the steering wheels 6 and 7 are turned in unison under control of the usual steering wheel forming a part of the steering column 18.

It will be noted particularly from Figure 1 that the pivotal mountings for the inner ends of the tie rods normally are positioned adjacent the point of convergence of or are alined with the axes of the swinging levers 4 and 5 and because of this relation, relative movement between the chassis frame and suspension arms occurs without displacing either of the spaced and independently suspended pivoted steering wheel knuckles during general straight ahead travel.

I claim:

1. In combination, a frame, a pair of independent wheel suspension levers mounted on the frame on intersecting axes, steerable wheels on said levers, a pair of wheel connected rods extending inwardly toward the point of intersection of said axes, a motion transmitting link operably connected to said rods at spaced points normally aligned, respectively, with the axis of an associated wheel suspension lever and disposed transversely of the frame, an idler lever mounted on the frame to support one end of said link, and a steering gear pitman arm connected to the opposite end of said link.

2. In a motor vehicle, a frame, an offset steering column assembly having an operating member, a transverse link connected at one end to said member, guide means supporting the other end of the link, a pair of outwardly extending tie rods joined at their inner ends to an intermediate portion of said link, steerable wheels connected to the outer ends of the rods, and independent wheel suspension arms hinged to the frame on diagonally related axes converging toward said intermediate portion of the link in coaxial relation with the joint axes at the inner ends of the tie rods.

3. In a motor vehicle having a frame, independent steerable wheel assemblies pivotally mounted on the frame, a transversely shiftable steering rod mounted at opposite ends by a pair of spaced frame carried swinging levers, a coupling plate projecting from said rod intermediate its opposite ends and steering links associated with the wheel assemblies and pivotally connected to said projected coupling plate on spaced axes normally coincident with the pivotal mounting axes of their respective associated wheel assemblies.

MAURICE A. THORNE.